Figure 1:
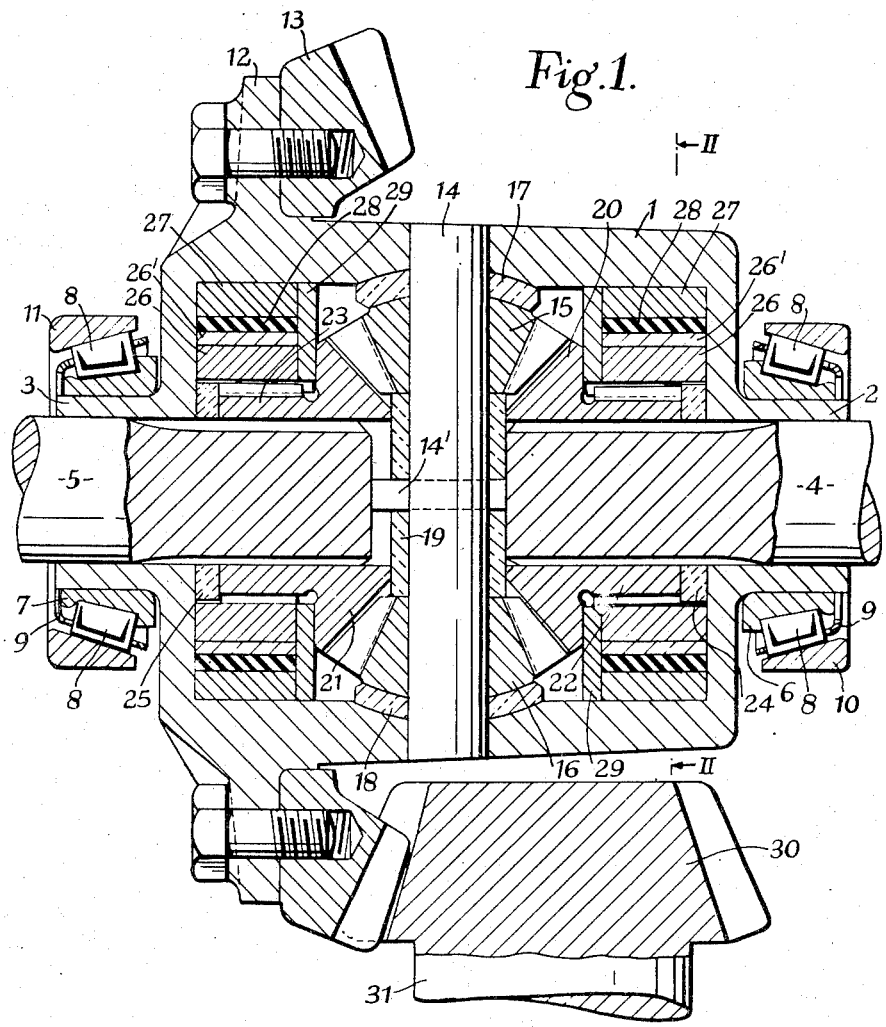

March 19, 1957 A. C. SAMPIETRO 2,785,588
DIFFERENTIAL GEARING

Filed April 7, 1952 2 Sheets-Sheet 1

INVENTOR
Achille C. Sampietro
BY
Ralph B. Stewart
ATTORNEY

March 19, 1957  A. C. SAMPIETRO  2,785,588
DIFFERENTIAL GEARING
Filed April 7, 1952  2 Sheets-Sheet 2
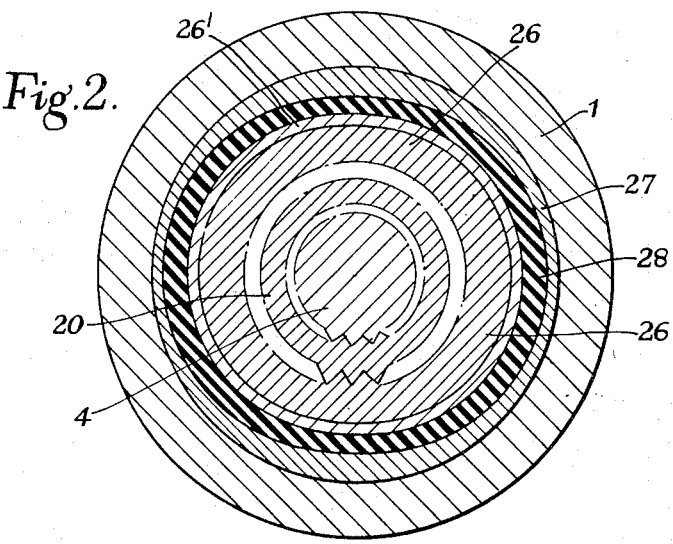
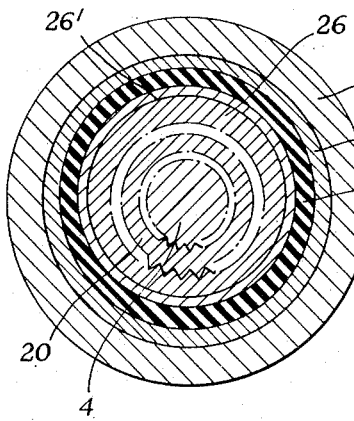
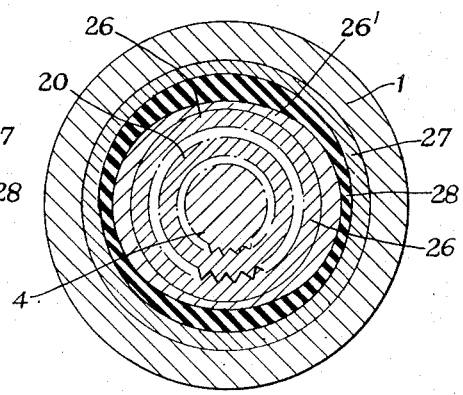
INVENTOR
Achille C. Sampietro
BY
Ralph B. Stewart
ATTORNEY United States Patent Office 2,785,588
Patented Mar. 19, 1957

2,785,588

DIFFERENTIAL GEARING

Achille Carlo Sampietro, Egham, England

Application April 7, 1952, Serial No. 280,916

Claims priority, application Great Britain April 18, 1951

7 Claims. (Cl. 74—711)

The present invention relates to differential gearing and has for its object to provide an improved differential gearing which will divide the torque of the input element substantially equally between the output elements so long as the difference of speed between said output element is low, but, when the difference in speed is high, will divide the torque unequally so that a smaller proportion thereof will be transmitted to the output element which is rotating faster in the required direction, than to the other output element.

With this object in view, the improved differential gearing according to the present invention is provided with means responsive to relative rotation between two output elements of the differential gearing to apply to at least one output element a torque tending to reduce the difference between the speed of said last-mentioned output element and the mean speed of both output elements, the magnitude of said torque varying in accordance with the relative speeds of said output elements.

The above-mentioned means may for example comprise a deformable element made from resilient material such for example as rubber, or a rubber-like substance such as those known by the generic name of "silicones," adapted to be deformed upon the occurrence of relative rotation between an output element of said differential gearing and the planet carrier, said material being capable of being deformed relatively readily when said relative rotation is low but being capable of offering increasing resistance to deformation as said relative rotation increases.

The said deformable element may for example be in the form of a ring disposed between surfaces adapted to rotate respectively with said output element and the planet carrier and of elliptical or other non-cylindrical form whereby relative rotation of said surfaces tends to change the shape of said ring. In another arrangement said surfaces may be of annular form and may be arranged eccentrically with respect to one another.

Said deformable material may for example be rubber or like material which is capable of resisting heat generated by the deformation thereof.

In order that the invention may be clearly understood and readily carried into effect it will now be described in more detail with reference to the accompanying drawings, in which:

Fig. 1 is a view in longitudinal section of one form of differential gearing according to the invention, Fig. 2 is a section on the line II—II of Fig. 1, Figs. 3 and 4 are views similar to Fig. 2 of other forms of differential gearing according to the invention.

Referring to Figs. 1 and 2 of the drawings the planet carrier comprises a substantially cylindrical casing 1 the end walls of which are provided with hubs 2 and 3 through which output shafts 4 and 5 respectively project and on which are disposed the inner races 6 and 7 of roller bearings 8 for said carrier, the bearings 8 being provided with a cage 9 and outer races 10 and 11 which are supported in any suitable manner by means not shown. The planet carrier is formed with an annular flange 12, concentric with the output shafts 4 and 5, to which flange 12 is bolted a crown wheel 13. A shaft 14 which is arranged centrally in said casing and the ends of which fit tightly into diametrically opposite apertures in the cylindrical wall of casing 1 carries two (or more) planet bevel gears 15 and 16 which are located in appropriate positions between bearings 17 and 18 and a cylindrical spacer 19 arranged centrally on shaft 14. Shafts 4 and 5 may for example be the axles of the driving wheels of a vehicle, in which case they are located in the differential gearing by the wheel bearings. Their inner ends abut against a pin 14' which projects through the shaft 14 and spacer 19. Sun gears 20 and 21 are keyed to the output shafts 4 and 5 respectively and are provided with hubs 22 and 23 which are spaced from the end walls of casing 1 by spacing rings 24 and 25 so that each sun gear 20 and 21 engages with both planet gears 15 and 16. Around each spacing ring 24 and 25 is disposed an inner ring, which in the arrangement shown is a composite ring comprising an inner part 26 keyed to the hub of the adjacent output shaft and the radially outer surface of which is elliptical, and an outer elliptical part 26'. The parts 26 and 26' of the inner rings are of different materials and are brazed together. If preferred the inner ring may be made in one piece. Around each of the parts 26' is disposed an outer ring 27. Rings 27 may be formed integrally with casing 1, or formed separately therefrom and brazed to the casing after being inserted in the casing. Between the part 26' of each inner ring and the associated outer ring 27 is disposed a ring 28 of resilient material such for example as heat-resisting rubber, said ring 28 filling the space between said part 26' and ring 27 and assuming the cross-sectional shape of said space, which as will be understood is bounded by inner and outer elliptical surfaces. A retaining ring 29 is provided between each sun gear 20 and 21 and the associated inner rings 26, 26' and outer rings 27 and ring 28 of deformable material.

In operation, when the crown wheel is rotated, under the action of a bevel pinion 30 mounted on a driving or input shaft 31, and the differential gearing rotates as a whole so that the two output shafts 4 and 5 are rotatng at the same speed, each annulus 28 retains its initial cross-sectional shape as seen in Fig. 2. When relative motion occurs between output shafts 4 and 5, due to said shafts being differently loaded, the relative motion between the planet carrier 1 and the sun gears 4 and 5, by virtue of the relative movement of the elliptical outer surface of the part 26' of each inner ring relative to the elliptical inner surface of the associated outer ring 27, will change the shape of the annulus 28 disposed between said surfaces, the annulus being compressed at two opposite places and permitted to expand at two other opposite places. The resistance of the ring 28 to deformation produces on each output shaft 4, 5 a restraining torque which tends to reduce the difference of speed of said output shafts. The deformation of the ring 28 is dynamic in nature, i. e., the magnitude of the deformation is not dependent upon the relative angular displacement of the inner ring 26 and the outer ring 27 but is independent thereof and the area of deformation moves around the ring 28 as long as relative motion is occurring between the two output shafts 4 and 5. Stated in another way, the material of which ring 28 is formed is forced to flow periodically from an area of small cross-sectional dimension to an adjacent area of larger cross-sectional dimension as the relative rotation of inner ring 26 and outer ring 27 causes the cross-sectional area between the two rings in any given axial plane stationary with respect to one ring to periodically vary between predetermined limits. The resistance of the ring 28 to deformation is a result of the internal friction caused by the flow of the material. So long as the relative rotation of the shafts 4 and 5 relative to the planet carrier is small the torque generated by the deformation of each annulus 28 will be small, the deformable material being capable of accommodating itself to the changed shape of the space between the elliptical surfaces, but as the relative rotation increases so will said restraining torque, the material from which said annuli are made being capable of being deformed without appreciable resistance when the rate of deformation is low but offering increasing resistance to deformation as the rate of deformation tends to increase. Thus if one output shaft is rotating faster than the other relatively to the planet carrier it will experience a greater restraining torque than the other output shaft, so that said other shaft experiences a major proportion of the torque applied to the differential gear through the driving or input shaft 30.

If desired, a deformable element may be provided between one only of the output shafts 4 and 5 and the planet carrier instead of between each output shaft and the planet carrier as in the above-described arrangement.

In a modification, instead of said deformable element being disposed between elliptical surfaces it may be disposed between cylindrical surfaces which are eccentrically arranged with respect to one another, each of said surfaces preferably being eccentric with respect to the axis of the shafts 4 and 5 (see Fig. 3), or one of said surfaces may be elliptical and the other may be cylindrical, as shown in Fig. 4 wherein the part 26' of the inner ring has an elliptical outer surface and the outer ring 27 has a cylindrical inner surface, which is preferably eccentric with respect to the axis of shafts 4 and 5 as shown.

I claim:

1. Differential gearing comprising two sun gears mounted on coaxially aligned shafts, a planet carrier carrying planetary gears in mesh with said sun gears, said shafts and said planet carrier all being angularly movable with respect to one another about the axis of said shafts, said planet carrier and said planetary gears constituting the input element of said differential gearing, and said sun gears together with their associated shafts constituting two output elements of said differential gearing, a part angularly movable with at least one of said output elements, a part angularly movable with said input element, said parts having surfaces which extend around said axis and which are separated by an annular space providing sufficient clearance for unrestricted relative rotation between said parts, said annular space having different cross-sectional areas at different angular positions about said axis, and a continuous ring of yieldable material filling said space, said yieldable material being deformed upon the occurrence of relative angular movement between said surfaces and having an internal frictional resistance to deformation which is small at a low relative speed of said surfaces and which increases as said relative speed increases.

2. Differential gearing as set forth in claim 1 wherein said material is a rubber-like silicone.

3. Differential gearing comprising an input element, two relatively movable output elements, a first coupling element rotatable with said input element, a second coupling element rotatable with one of said output elements and mounted in spaced relation with said first coupling element for unrestricted relative rotation with respect to said first coupling element about a common axis, said first coupling element and said second coupling element having their adjacent surfaces so shaped that upon relative rotation of the two coupling elements the cross-sectional area therebetween in any given axial plane stationary with respect to one coupling element continuously varies between predetermined limits, and a deformable material having a relatively high internal resistance to flow disposed in the space between said coupling elements and being dynamically deformed by relative rotation between said coupling elements.

4. Differential gearing in accordance with claim 3 wherein said material has an internal resistance to flow which increases with an increase in the rate of deformation.

5. Differential gearing comprising an input element, two relatively movable output elements, a first coupling element rotatable with said input element, a second coupling element rotatable with one of said output elements and mounted in spaced relation with said first coupling element for unrestricted relative rotation with respect to said first coupling element about a common axis, a continuous ring of deformable material surrounding said axis and providing an annular coupling between said coupling elements, at least one of said coupling elements having a portion thereof shaped to deform the cross-section of said ring over a portion thereof which moves progressively around the perimeter of said ring during relative rotation between said coupling elements, said deformable material having an internal frictional resistance to flow which increases with increase in the rate of deformation.

6. Differential gearing comprising a rotary input element, two relatively movable output elements, a first coupling element rotatable with said input element, a second coupling element rotatable with one of said output elements and mounted in spaced relation with said first coupling element for unrestricted relative rotation with respect to said first coupling element about a common axis, a continuous ring of deformable material surrounding said axis and providing an annular coupling between said coupling elements, said coupling elements having non-cylindrical surfaces engaging said ring to deform the cross-section of said ring over a portion thereof which moves progressively around the perimeter of said ring during relative rotation between said coupling elements, said deformable material having an internal frictional resistance to flow which increases with increase in the rate of deformation.

7. Differential gearing comprising a rotary input element, two relatively movable output elements, a first coupling element rotatable with said input element, a second coupling element rotatable with one of said output elements and mounted in spaced relation with said first coupling element for unrestricted relative rotation with respect to said first coupling element about a common axis, a continuous ring of deformable material surrounding said axis and providing an annular coupling between said coupling elements, said coupling elements having cylindrical surfaces engaging said ring in eccentric relation relatively to one another to deform the cross-section of said ring over a portion thereof which moves progressively around the perimeter of said ring during relative rotation between said coupling elements, said deformable material having an internal frictional resistance to flow which increases with increase in the rate of deformation.

References Cited in the file of this patent

UNITED STATES PATENTS

| 1,285,017 | Brush | Nov. 19, 1918 |
| 1,585,438 | Taylor | May 18, 1926 |
| 1,649,426 | Van Ranst | Nov. 15, 1927 |
| 1,733,771 | Baker | Oct. 29, 1929 |
| 1,750,981 | Wildhaber | Mar. 18, 1930 |
| 1,780,727 | Tenney | Nov. 4, 1930 |
| 1,979,414 | Smith | Nov. 6, 1934 |
| 2,283,325 | Fawick | May 19, 1942 |
| 2,363,469 | Goldschmidt | Nov. 21, 1944 |
| 2,397,374 | Schlicksupp | Mar. 26, 1946 |

FOREIGN PATENTS

| 654,224 | Germany | Dec. 18, 1937 |